UNITED STATES PATENT OFFICE.

EMIL BARELL, OF BASLE, SWITZERLAND, ASSIGNOR TO F. HOFFMANN-LA ROCHE & CO., OF SAME PLACE.

PROCESS OF MANUFACTURING PARA-GUAIACOL SULFONIC ACID.

SPECIFICATION forming part of Letters Patent No. 623,760, dated April 25, 1899.

Application filed June 7, 1898. Serial No. 682,800. (Specimens.)

*To all whom it may concern:*

Be it known that I, EMIL BARELL, a citizen of the Swiss Republic, and a resident of Basle, Switzerland, have invented a certain new and useful Improved Process of Manufacturing Para-Guaiacol Sulfonic Acid, of which the following is a specification.

I have discovered that by heating para-bromoguaiacol having the formula

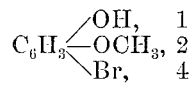

with sulfites the halogen group can be exchanged for a sulfo group.

I produce para-monobromoguaiacol, a compound hitherto unknown so far as I am aware, by one of the usual brominizing methods—for example, by bringing about the reaction in the cold of two molecules of bromine chloride upon one molecule of guaiacol. The product in a pure state is in the form of fine white crystalline needles, which melt at a temperature of from 45° centigrade to 46° centigrade and which readily dissolve in most liquid solvents—as, for example, in glacial acetic acid, alcohol, ether, chloroform, &c.

An analysis of the new compound gives the following results:

Calculated for $C_7H_7O_2Br$:     Found:
$C = 41.38\%$                      $C = 41.18\%$
$H = 3.45\%$                       $H = 3.57\%$
$Br = 39.41\%$                     $Br = 39.35\%$ The indicated formula is as follows:

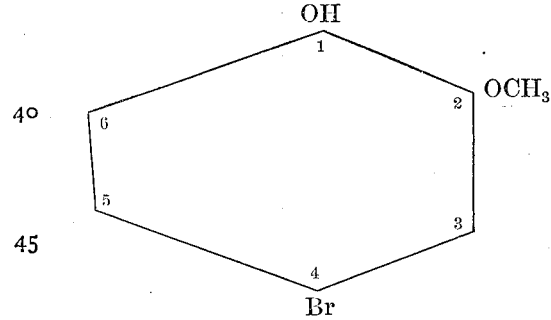

The new compound may be transformed by melting it with an alkali into the corresponding trioxybenzol, and I have, indeed, obtained the 2-methylether of the 1-2-4-phentriol described by Will, (*Berichte der Deutschen Chemischen Gesellschaft*, Vol. 21, p. 606.)

I effect the transformation of the para-bromoguaiacol into crystallized para-guaiacol sulfonic acid by the following special process:

Example: 2.030 kilos of para-bromoguaiacol are heated while being stirred in a suitable vessel with twelve kilos of water and 1.200 kilos of potassium bisulfite up to a temperature of from 180° centigrade to 220° centigrade for from twelve to eighteen hours. When the reaction shall have been effected, the contents of the vessel is concentrated by evaporation and the potassium bromide formed is allowed to crystallize out. In the aqueous liquor remaining, which is then filtered, will be found the free para-guaiacol sulfonic acid. This compound crystallizes out of the concentrated aqueous solution or out of dilute spirits in a chemically-pure state and in the form of white laminæ or scales. These are not fusible up to 270° centigrade. They dissolve in from three to four parts of water at 15° centigrade and in one part of boiling water. They are very difficult to dissolve in alcohol and are insoluble in ether, chloroform, benzol, acetone, &c. When heated with concentrated sulfuric acid, the compound is dissolved without imparting color to the solution.

The taste of the pure compound is very slightly bitter and in no respect suggests that of guaiacol. It has no caustic effect on the mucous surfaces and is employed for the treatment of tuberculosis in doses of from one-half grain to one grain taken at a time and from three to five grains per day.

With ferric chloride the acid produces an intense green color, which turns to a raspberry red or Bordeaux red on the addition thereto of ammonia.

By neutralizing the free acid with hydroxides, carbonates, or bicarbonates the corresponding salts are obtained.

If this para-guaiacol sulfonic acid is fused with an alkali at about 300° centigrade, there results the 2-methylether of the 1-2-4-phentriol.

From the fact that the same trioxybenzol is derived as well from the para-guaiacol sulfonic acid above described as from the para-bromoguaiacol the connection of these two bodies, as well as their constitution, is established without doubt, and to the guaiacol sulfonic acid in question the formula and configuration following may be safely and definitely assigned:

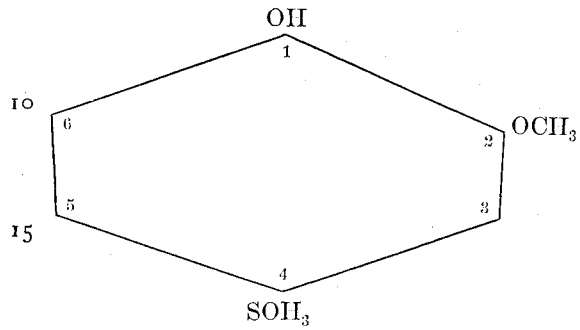

Having thus described my invention, I claim—

The herein-described method of making crystallized para-guaiacol sulfonic acid, which consists in heating para-bromoguaiacol with an aqueous solution of a sulfite until the reaction is effected, then concentrating the solution for the removal of the resultant bromide salt, and then crystallizing the sulfonic acid from the said solution.

In witness whereof I have hereunto signed my name, this 25th day of May, 1898, in the presence of two subscribing witnesses.

EMIL BARELL.

Witnesses:
GEORGE GIFFORD,
AMAND RITTER.